Jan. 9, 1934.  W. N. BOOTH  1,943,158
WHEEL HUB
Filed June 18, 1928
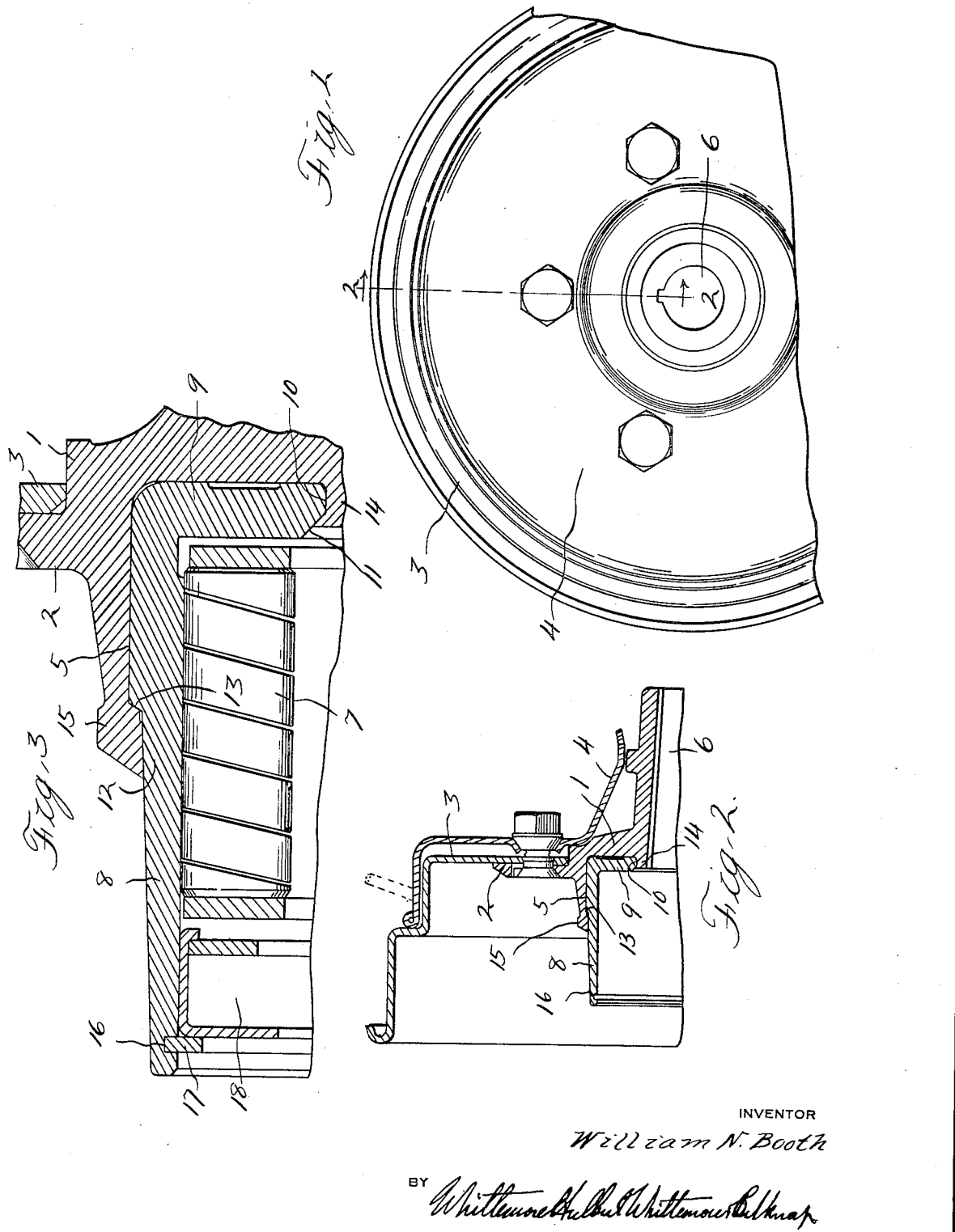
INVENTOR
William N. Booth
BY
ATTORNEYS Patented Jan. 9, 1934

1,943,158

UNITED STATES PATENT OFFICE 1,943,158

WHEEL HUB

William N. Booth, Detroit, Mich., assignor to Kelsey-Hayes Wheel Corporation, Detroit, Mich., a corporation of New York Application June 18, 1928. Serial No. 286,410

6 Claims. (Cl. 301—105)

The invention relates to wheel hubs and more particularly hubs of motor vehicle wheels. The invention has for its main object to so construct the wheel hub that the part for engaging a load supporting bearing may be properly hardened and at the same time the barrel may be kept within proper dimensions to accommodate the load supporting bearing and the brake actuating mechanism. Another object is to so construct the wheel hub that its parts may be firmly secured to each other. With these as well as other objects in view, the invention resides in the novel features of construction and combinations and arrangements of parts as more fully hereinafter set forth.

In the drawing:—

Figure 1 is a front view of a portion of a wheel hub embodying my invention;

Figure 2 is a cross section on the line 2—2 of Figure 1;

Figure 3 is an enlarged view of a portion of Figure 2.

The wheel hub shown in the present instance is a rear hub of a demountable wheel of a motor vehicle, in which the clearance for the load supporting bearing and the brake actuating mechanism is limited and the bearing contacts with the barrel. A well known make of motor vehicle uses this type of wheel hub, but this hub is so constructed that considerable difficulty has been experienced in hardening the surface of the barrel for engaging the bearing throughout the length of the latter.

With my invention the surface of the barrel for engaging the bearing may be hardened and at the same time the wheel hub is substantially constructed within the necessary dimensions so that the wheel hub will not interfere with nor necessitate any change in construction of the bearing or the brake actuating mechanism. In detail, 1 is the external barrel section of the hub and 2 the radially extending fixed flange, which is preferably forged integral with the barrel section and extends therefrom intermediate its ends. This flange has secured to its front face the brake drum 3 against the front face of which may be detachably secured the demountable wheel body 4, which in the present instance is a wire wheel body. This barrel section has the axially extending cup-shaped recess 5 which terminates adjacent the plane of the fixed flange 2 and also the axially extending opening 6 which communicates with the recess 5 and is adapted to receive the drive shaft of the motor vehicle.

7 is the load supporting bearing preferably in the nature of a roller bearing. For engaging this bearing I have provided the internal barrel section 8, which is preferably cup-shaped and is insertable into the recess 5. This barrel section may be formed by drawing and is suitably hardened for the purpose of securing long life. For securing the internal barrel section to the external barrel section, the former has its base 9 formed with the axial opening 10, the rear end of which is preferably countersunk at 11 and its side 12 formed with the external annular shoulder 13, which in the present instance is produced by decreasing the thickness of the rear portion of the side. The external barrel section has the projection 14 surrounding the rear end of the opening 6 and extending into the opening 10 and peened over upon the countersunk portion 11. The external barrel section also has the enlargement 15 at the rear end peened over upon the annular shoulder 12. The base and side of the internal barrel section are made to closely fit the external barrel section so that when the projection 14 and the enlargement 15 have been peened over, the internal barrel section is rigidly secured in the external barrel section. The internal barrel section has at its rear end the annular groove 16 for receiving a suitable retainer means 17 for holding the grease retainer 18 in place.

What I claim as my invention is:

1. A wheel hub adapted to be mounted upon a bearing, said hub having an external barrel section provided with an axially extending cup-shaped recess, a cup-shaped internal barrel section for engaging said bearing and insertable into the recess, and means upon said external barrel section and engageable with the side and base of said internal barrel section for rigidly securing the latter to the former.

2. A wheel hub adapted to be mounted upon a bearing, said hub having an external barrel section provided with an axially extending cup-shaped recess, a cup-shaped internal barrel section insertable into the recess and provided with an opening in its base, and means upon said external barrel section engaging in the opening in said base for securing said internal barrel section to said external barrel section.

3. A wheel hub adapted to be mounted upon a load supporting bearing, said hub having an external barrel section provided with an axially extending cup-shaped recess, an internal barrel section for engaging said bearing insertable into the recess and provided with an opening in its base and an external shoulder upon its side, and means upon said external barrel section and adapted to extend through the opening and to be clamped against the base for securing said internal barrel section to said external barrel section, said external barrel section also having a portion adapted to be clamped against the shoulder to secure said internal barrel section to said external barrel section.

4. A wheel hub adapted to be mounted upon an antifriction load supporting bearing, said hub having an external barrel section and a fixed flange thereon intermediate the ends thereof, said external barrel section being provided with an axially extending cup-shaped recess terminating adjacent the plane of said fixed flange, an internal barrel section for engaging said bearing insertable into the recess, and cooperating means upon said barrel sections for rigidly securing the same to each other.

5. A wheel hub adapted to be mounted upon a bearing, comprising an external barrel section having an end wall, an internal barrel section sleeved within the external barrel section and having an end wall engageable with the end wall aforesaid of the external barrel section, and cooperating interengaging means upon said end walls establishing an interlocking connection therebetween for rigidly securing the barrel sections in assembled relation.

6. A wheel hub comprising a barrel section having a radially inwardly extending portion and having a cylindrical portion provided with an inwardly extending annular shoulder spaced axially from the radial portion aforesaid, a cup-shaped section arranged within the cylindrical section with the base portion thereof abutting the radial portion aforesaid of the first-named section and having an opening in said base for receiving an axial projection on the radial portion of the first-mentioned section, a shoulder on the axial projection engaging a cooperating shoulder on the cup-shaped section for maintaining the base in abutting relationship to the radial portion of the first-mentioned section, and an annular shoulder on said second section intermediate the ends thereof for engaging the inwardly extending shoulder on the cylindrical portion of the first-named section to cooperate with the engaging shoulders aforesaid in securing the two sections together.

WILLIAM N. BOOTH.